United States Patent
Carobolante

(10) Patent No.: US 9,543,782 B2
(45) Date of Patent: Jan. 10, 2017

(54) APPARATUS AND METHOD FOR LOST POWER DETECTION

(71) Applicant: QUALCOMM Incorporated, San Diego, CA (US)

(72) Inventor: Francesco Carobolante, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 14/489,970

(22) Filed: Sep. 18, 2014

(65) Prior Publication Data

US 2016/0087476 A1    Mar. 24, 2016

(51) Int. Cl.
*H02J 7/00*     (2006.01)
*H04B 1/38*     (2015.01)
(Continued)

(52) U.S. Cl.
CPC ............... *H02J 7/025* (2013.01); *H02J 50/12* (2016.02); *H02J 50/60* (2016.02); *H04B 5/0037* (2013.01); *H02J 7/007* (2013.01); *H02J 50/40* (2016.02)

(58) Field of Classification Search
CPC ............ H02J 7/025; H02J 7/005; H02J 7/007; H04B 5/0037
(Continued)

(56) References Cited

U.S. PATENT DOCUMENTS 7,019,617 B2 *   3/2006   Pratt ................... G06K 7/0008
                                                         340/10.1
8,810,071 B2 *   8/2014   Sauerlaender .......... H02J 5/005
                                                         307/104
(Continued)

FOREIGN PATENT DOCUMENTS

EP        2779359 A2       9/2014
WO     WO-2013088238 A2    6/2013
WO     WO-2014060871 A1    4/2014

OTHER PUBLICATIONS

Kuyvenhoven, N., et al., "Development of a Foreign Object Detection and Analysis Method for Wireless Power Systems," 2011 IEEE Symposium on Product Compliance Engineering (PSES), pp. 1-6.
(Continued)

*Primary Examiner* — M'Baye Diao
(74) *Attorney, Agent, or Firm* — Knobbe Martens Olson & Bear LLP

(57) ABSTRACT

An apparatus and method for lost power detection are described. In one implementation, an apparatus for wirelessly transferring power includes an antenna configured to provide wireless power to a chargeable device sufficient to charge or power the chargeable device positioned within a charging region of the antenna. The apparatus further includes a receiver configured to receive from the chargeable device a measurement of a first amount of energy received by the chargeable device over a first period of time. The apparatus further includes a processor configured to measure a second amount of energy provided by the antenna
(Continued)

over a second period of time, compare the first amount of energy to the second amount of energy, and determine whether another object is absorbing power provided via the antenna based at least in part on comparing the first amount and the second amount of energy.

26 Claims, 7 Drawing Sheets

(51) Int. Cl.
*H01F 38/00* (2006.01)
*H02J 7/02* (2016.01)
*H04B 5/00* (2006.01)

(58) Field of Classification Search
USPC .......................... 320/108; 307/104; 455/573
See application file for complete search history.

(56) References Cited

U.S. PATENT DOCUMENTS

| | | | |
|---|---|---|---|
| 8,878,487 B2* | 11/2014 | Wu | B60L 1/003 320/108 |
| 9,331,495 B2* | 5/2016 | Soar | H02J 5/005 |
| 9,438,067 B2* | 9/2016 | Na | H02J 7/025 |
| 2002/0061031 A1* | 5/2002 | Sugar | H04W 16/14 370/466 |
| 2007/0228833 A1 | 10/2007 | Stevens et al. | |
| 2013/0062959 A1 | 3/2013 | Lee et al. | |
| 2013/0214732 A1* | 8/2013 | Nowottnick | G07C 9/00309 320/108 |
| 2013/0307348 A1 | 11/2013 | Oettinger et al. | |
| 2014/0015335 A1 | 1/2014 | Lee et al. | |
| 2014/0028093 A1 | 1/2014 | Aikawa et al. | |
| 2014/0070764 A1 | 3/2014 | Keeling | |
| 2014/0307569 A1* | 10/2014 | Barbieri | H04L 5/0032 370/252 |
| 2015/0278038 A1* | 10/2015 | Halker | G06F 11/20 714/3 |

OTHER PUBLICATIONS

International Search Report and Written Opinion—PCT/US2015/049192—ISA/EPO—Dec. 7, 2015 (141325WO).

* cited by examiner

APPARATUS AND METHOD FOR LOST POWER DETECTION

FIELD

The described technology generally relates to wireless power. More specifically, the disclosure is directed to devices, systems, and methods related to detection of non-compliant objects present in a magnetic field.

BACKGROUND

Loosely coupled wireless power systems include a power transfer unit (e.g., a charging device) and one or more power receive units (e.g., a cellphone, a laptop, etc.) to be charged. When non-compliant objects are present within, near, or around the charging region of the power transfer unit, electrical energy may be lost in the wireless power system. The lost electrical energy may harm a user, damage a device or object, start a fire, etc. As such, it is desirable to detect when the power system experiences a loss in power and to respond appropriately.

SUMMARY

Various embodiments of systems, methods and devices within the scope of the appended claims each have several aspects, no single one of which is solely responsible for the desirable attributes described herein. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for wirelessly transferring power. The apparatus includes an antenna configured to provide wireless power to a chargeable device sufficient to charge or power the chargeable device positioned within a charging region of the antenna. The apparatus further includes a receiver configured to receive from the chargeable device a measurement of a first amount of energy received by the chargeable device over a first period of time. The apparatus further includes a processor configured to measure a second amount of energy provided by the antenna over a second period of time. The processor further configured to compare the first amount of energy received from the chargeable device to the second amount of energy over the second period. The processor further configured to determine whether an object other than the chargeable device is absorbing power provided via the antenna based at least in part on comparing the first amount of energy and the second amount of energy.

Another aspect of the disclosure provides a method for wirelessly transferring power. The method includes transmitting power from a transmitter at a power level sufficient to power or charge one or more chargeable devices positioned within a charging region. The method further includes receiving from the one or more chargeable devices a measurement of a first amount of energy received by the chargeable devices over a first period of time. The method further includes measuring a second amount of energy provided by the transmitter over a second period of time. The method further includes comparing the first amount of energy received from the chargeable devices to the second amount of energy provided by the transmitter over the second period. The method further includes determining whether an object other than the chargeable device is absorbing power provided via the transmitter based at least in part on comparing the first amount and the second amount of energy.

Another aspect of the disclosure provides an apparatus for wirelessly transferring power. The apparatus includes means for transmitting power at a power level sufficient to power or charge one or more chargeable devices positioned within a charging region. The apparatus further includes means for receiving from the one or more chargeable devices a measurement of a first amount of energy received by the one or more chargeable devices over a first period of time. The apparatus further includes means for measuring a second amount of energy provided by the transmitting means over a second period of time. The apparatus further includes comparing the first amount of energy received from the one or more chargeable devices to the second amount of energy provided by the transmitting means over the second period. The apparatus further includes means for determining whether an object other than the one or more chargeable devices is absorbing power provided via the transmitting means based at least in part on comparing the first amount and the second amount of energy.

Another aspect of the disclosure provides a non-transitory computer readable medium. The medium comprising instructions that when executed cause a processor to perform a method of transmitting power from a transmitter at a power level sufficient to power or charge one or more chargeable devices positioned within a charging region. The medium further comprising instructions that when executed cause a processor to perform a method of receiving from the one or more chargeable devices a measurement of a first amount of energy received by the one or more chargeable devices over a first period of time. The medium further comprising instructions that when executed cause a processor to perform a method of measuring a second amount of energy provided by the transmitter over a second period of time. The medium further comprising instructions that when executed cause a processor to perform a method of comparing the first amount of energy received from the one or more chargeable devices to the second amount of energy provided by the transmitter over the second period. The medium further comprising instructions that when executed cause a processor to perform a method of determining whether an object other than the one or more chargeable devices is absorbing power provided via the transmitter based at least in part on comparing the first amount and the second amount of energy.

Another aspect of the disclosure provides an apparatus for wirelessly receiving power. The apparatus includes an antenna configured to receive wireless power from a wireless power transmitter. The apparatus further includes a processor configured to determine an amount of energy received by the antenna over a period of time. The apparatus further includes a transmitter configured to transmit the measurement of the amount of energy received by the antenna over the period of time.

Another aspect of the disclosure provides a method for wirelessly receiving power. The method includes wirelessly receiving power from a wireless power transmitter. The method further determining an amount of energy received by the antenna over a period of time. The apparatus further includes transmitting the determined amount of energy received by the antenna over the period of time.

Figure 1:
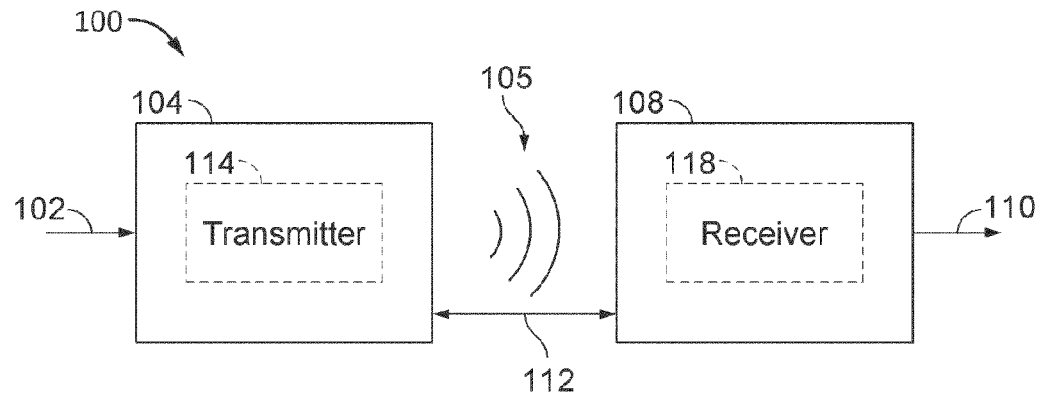
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" (or "receive antenna") to achieve power transfer.

FIG. 1 is a functional block diagram of an exemplary wireless power transfer system 100, which may be a loosely coupled wireless power system, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or similar, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 108. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region. In one embodiment, the transmit antenna 114 and the receive antenna 118 may communicate via a Bluetooth Low Energy (BLE) link.

Figure 2:
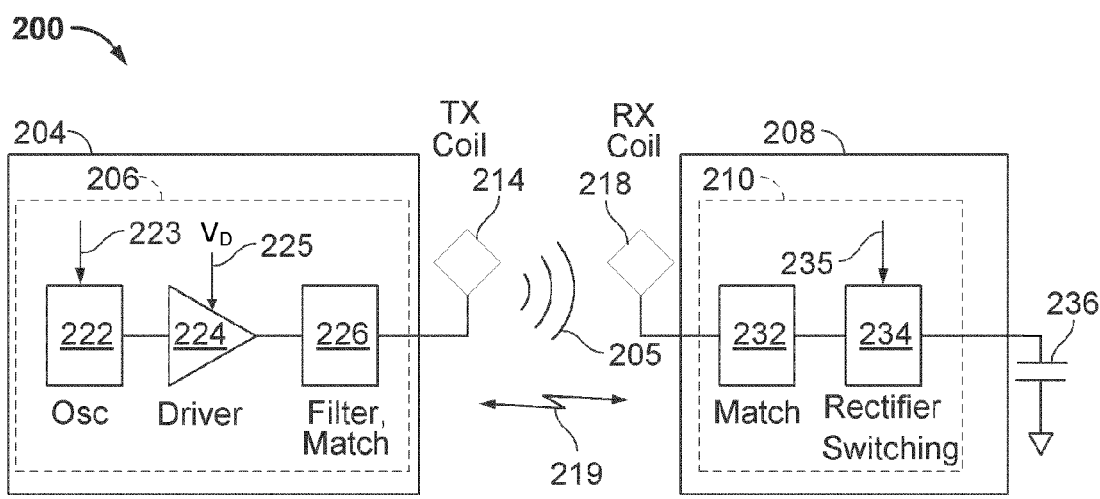
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or power an electronic device. As one example, the power provided may be for example on the order of 300 milliWatts to 20 Watts to power or charge different devices with different power requirements. Higher or lower power levels may also be provided. In one embodiment, the transmit antenna 214 and the receive antenna 218 may communicate via a Bluetooth Low Energy (BLE) link.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and the transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 205.

As described more fully below, the receiver 208, that may initially have a selectively disablable associated load (e.g., the battery 236), may be configured to determine whether an amount of power transmitted by the transmitter 204 and received by the receiver 208 is appropriate for charging a battery 236. Further, the receiver 208 may be configured to enable a load (e.g., the battery 236) upon determining that the amount of power is appropriate. In some embodiments, the receiver 208 may be configured to directly utilize power received from a wireless power transfer field without charging of the battery 236. For example, a communication device, such as a near-field communication (NFC) or radio-frequency identification device (RFID) may be configured to receive power from a wireless power transfer field and communicate by interacting with the wireless power transfer field and/or utilize the received power to communicate with the transmitter 204 or other devices.

Figure 3:
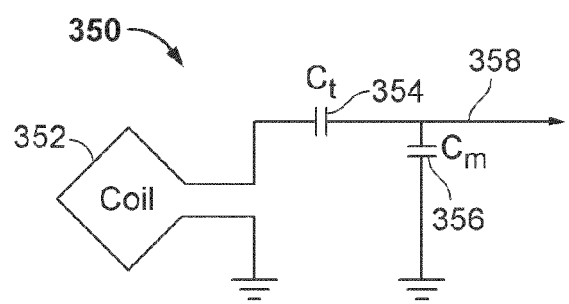
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352 (or "loop" antenna). The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful. The antenna 352 may be a coil (e.g., an induction coil) and/or an RF antenna, or any other suitable device to wirelessly receive or output power. The antenna 352 may be implemented with a Litz wire or as an antenna strip designed for low resistance. The antenna 352 may not need "turns" to be of a practical dimension. An exemplary implementation of the antenna 352 may be "electrically small" (e.g., a fraction of the wavelength) and tuned to resonate at a usable low frequency by using capacitors to define the resonant frequency.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, the capacitor 354 and the capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 352. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4A:
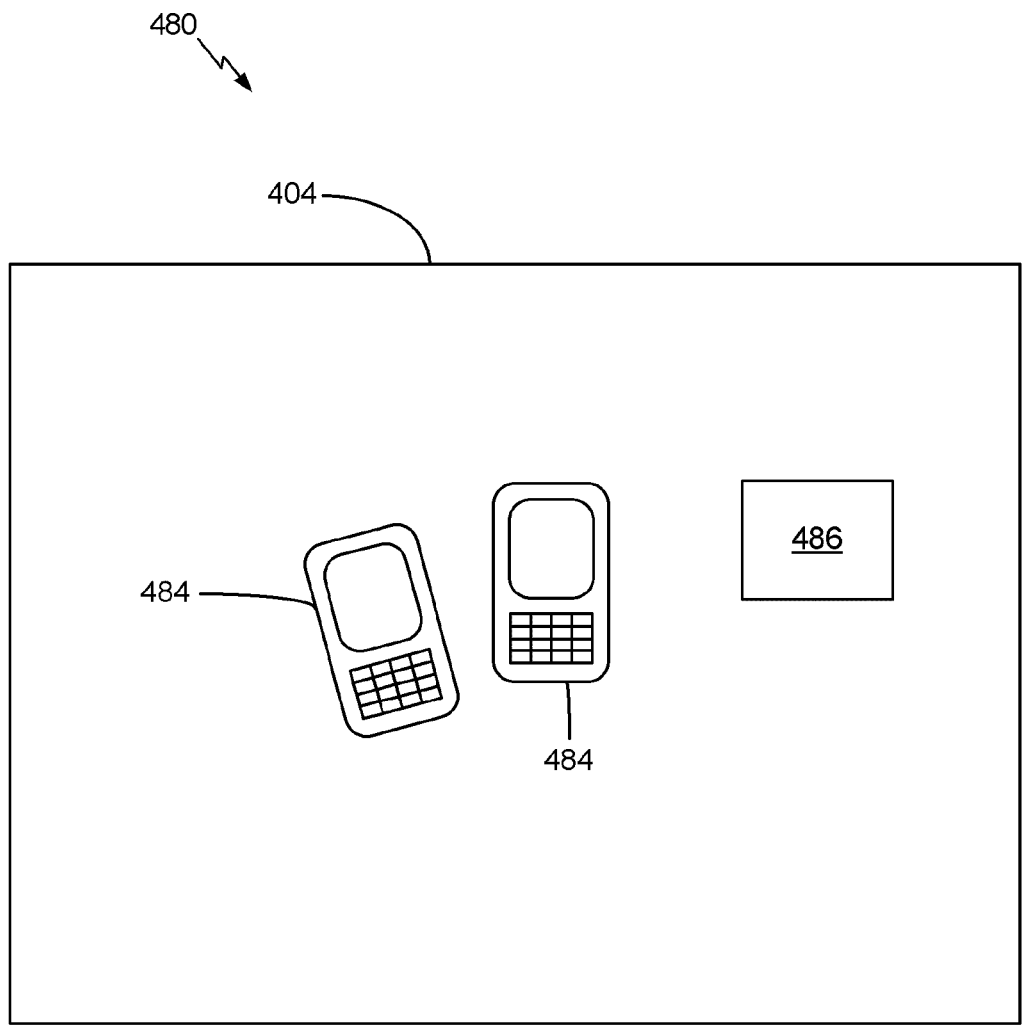
FIG. 4A illustrates a wireless power system including a wireless power transmitter and receivers, according to an exemplary embodiment of the invention.

FIG. 4 illustrates a wireless power system 480 including a power transfer unit "PTU" 404 (e.g., a power transfer unit that provides wireless charging) and one or more power receive units "PRUs" 484 (e.g., power receive units that are wirelessly chargeable devices), according to an exemplary embodiment of the invention. The PTU 404 may create a magnetic field which couples to the PRU 484. The PRU 484 may convert magnetic energy received from the PTU 404 into electrical energy. The PRUs 484 may include devices such as cellular phones, portable music players, computers, laptop computers, tablet computers, computer peripheral devices, communication devices (e.g., Bluetooth headsets), digital cameras, hearing aids (and other medical devices), etc. In one embodiment, the PRU 484 may be connected to a device to be charged which draws on the electrical energy. In another embodiment, the device to be charged may be integrated into the PRU 484. The PRU 484 may be placed on the PTU 404 for the purpose of charging the PRU 484. In one embodiment, the PTU 404 and the PRU 484 may communicate via a Bluetooth Low Energy (BLE) link.

In one embodiment, the wireless power system 480 includes a non-compliant object 486 (or "non-compliant device," "foreign object," or "foreign device"), which may comprise a non-compliant device or component. The non-compliant object 486 may include a damaged device, a device not built to the correct specifications (e.g., not in compliance with a charging standard or any other object made of electrically conductive material that couples to the magnetic field (e.g., jewelry, eye-glasses, key-chains, etc.). In one embodiment, the non-compliant object 486 may be any object or device that is unable to communicate with the PTU 404 and function with a system control algorithm, which allows the PTU 404 no method to regulate or detect the electrical energy consumed by the non-compliant object 486. Since the PTU 404 creates a magnetic field, electrical energy may be transferred to any device or object that couples to the PTU 404 magnetic field. The non-compliant object 486 and each of the one or more PRUs 484 may be positioned within, near, or around a charging region of the PTU 404, which may cause the PRUs 484 to couple to the PTU 404 magnetic field and absorb electrical energy. In this way, the non-compliant object may affect the consumption of power transmitted by the PTU 404 and/or affect the charging region when it is within, near, or around the charging region. The energy absorbed may be dissipated as heat, which may damage the non-compliant object 486, harm or burn the user, cause a fire, damage the PTU 404, or create any other safety issue. Without a non-compliant object or non-compliant device detection system, the PTU 404 may continue to transfer power to the non-compliant object 486 indefinitely. According to one or more methods, the PTU 404 may be configured to detect the non-compliant object 486, as described below. As mentioned, the PTU 404 may be configured to detect, according to one or more methods, one or more of the non-compliant objects 486 affecting an associated charging region. The PTU 404 may detect the non-compliant object 486 using a method based on system measurements taken on both the PTU 404 and the one or more PRU 484. In one embodiment, the PTU 404 may sample the current and voltage at both the PTU 404 coil or power amplifier (PA) supply (e.g., driver circuit 724, see FIG. 7) and the PRU 484 rectifier output (e.g., output of the RF-to-DC converter 820, see FIG. 8). The PTU 404 calculates the instantaneous power based on the current and voltage measurements at the sampled times at both the PTU 404 coil or PA supply and the rectifier output of the one or more PRU 484. The PTU 404 may then compare the two readings and assess if the difference between the two readings is justified by the parasitic losses in the system or if it is excessive (e.g., exceeds a threshold), thus indicating the presence of non-compliant object 486.

Figure 4B:
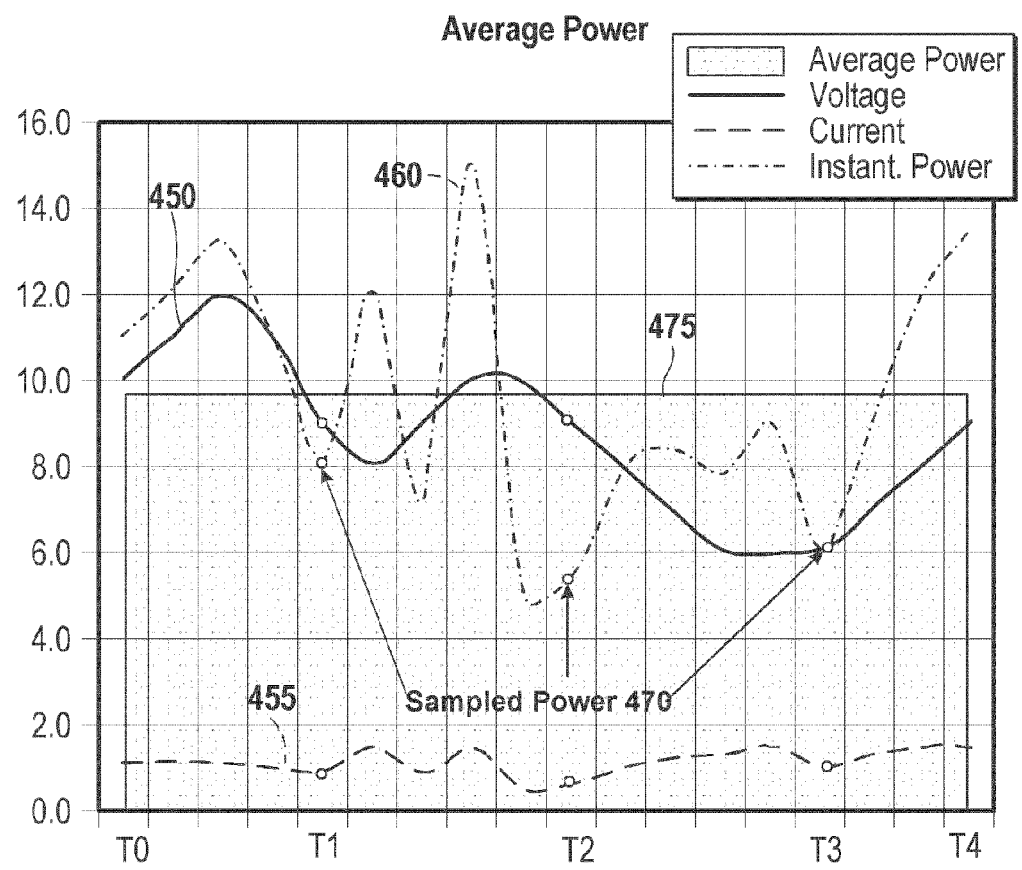
FIG. 4B is a graph of voltage, current, and power measurements of an exemplary load.

Two issues are intrinsically present with such power sampling at the PTU 404 and PRU 484: (i) since there may be no real time clock in the system, it may be very difficult to synchronize the readings, therefore if the load varies, the comparison may not be accurate or relevant; and (ii) since the samplings occur at finite time intervals (typically >>1 ms), if the loads vary at a high rate (>>1 KHz has been measured in the real application) the probability that the measurements are representative of the average power quickly degrades. For example, FIG. 4B is a graph of voltage 450 and current 455 measurements of a PRU load over time. The instantaneous power 460 absorbed by the load is the product of the instantaneous voltage 450 and current 455: as their values change dynamically, using the sampled values (e.g., sampled instantaneous power values 470) to determine the average power 475 absorbed may lead to erroneous conclusions. As can be shown in FIG. 4B, these values 470 may not accurately capture average power between sample times because the power values of the load may have significant fluctuations. The information therefore may not capture the dynamic behavior of the load unless the sampling frequency is very high, which may be impractical due to increased processing time and cost of implementation. Low-pass filters, which average the instantaneous values, may help improve the measurements, but do not accurately capture the instantaneous product of current and voltage, and may require relatively large time constants, which are not easily integrateable.

Exemplary embodiments, as described herein, relate to accurate power loss measurements that help capture the dynamic behavior of the load. According to one exemplary embodiment, the PTU 404 may measure the integral of the power during the entire sampled time at both the PTU 404 and the PRU 484 (which is equivalent to the average power during the sampled period times the sampled period duration). The integral of the power represents the energy (e.g., total power over a period of time) at both the PTU 404 and the PRU 484. FIG. 4B also shows the integral of the power of the load over the time T0-T4 as the shaded area 475. Measuring the energy, instead of the power, at both the PTU 404 and the PRU 484 has several advantages. For example, the energy more accurately measures the total power at both the PTU 404 and the PRU 484 over a period of time and thus may more accurately detect the presence of the non-compliant object 486, as the measurement is less subject to random noise and instantaneous variation of the load. Such accuracy may be particularly important when integrating over a longer period of time and/or large energy transfer. For example the PTU 404 may have to detect a relatively small amount of lost power (e.g., 1 W) compared to the total power measured over the sampled period of time (e.g, 50 W). Therefore, it may be desirable to have the energy measurements be accurate over a relatively large dynamic range.

Figure 5:
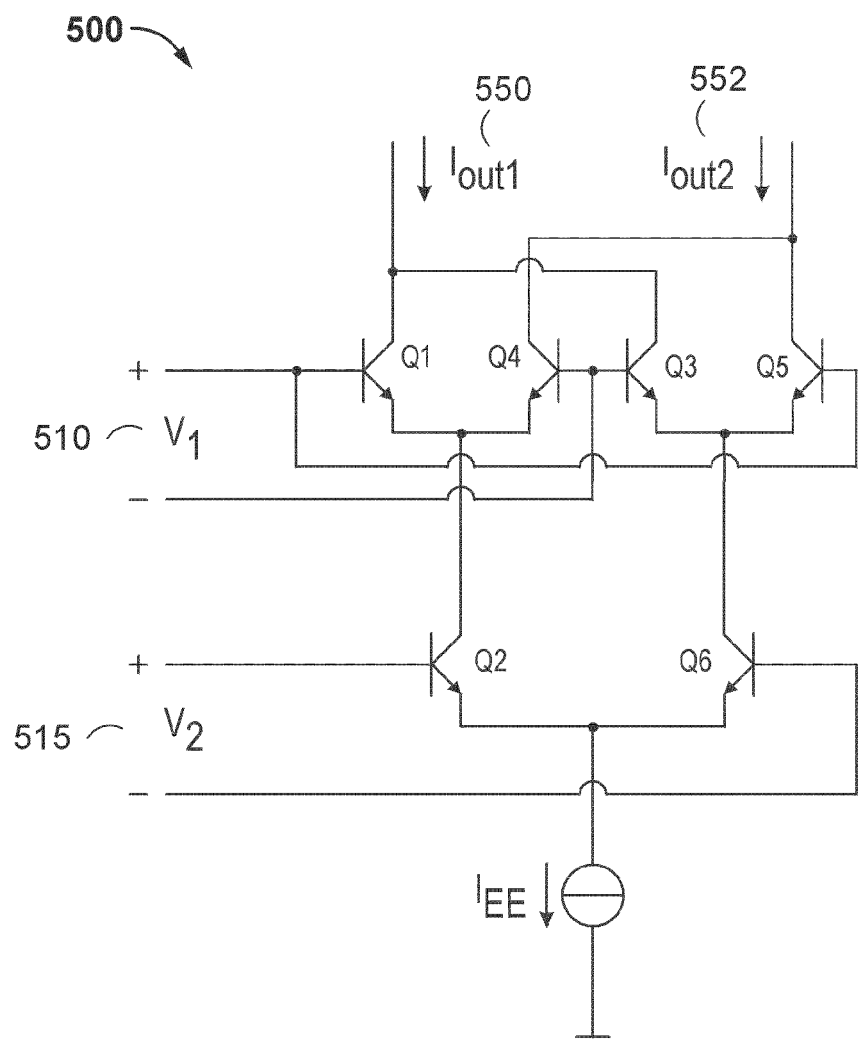
FIG. 5 is a diagram of an exemplary Gilbert multiplier cell.

Measuring the energy of the PTU 404 and the PRU 484 (as an integral of the power measurements over time) can be accomplished with a continuous-time integrator of the product of the current and voltage. An example of such implementation may be built by using a Gilbert multiplier cell (see FIG. 5) to provide the product of a current and a voltage followed by a capacitive integrator. FIG. 5 is a diagram of an exemplary Gilbert multiplier cell 500 in accordance with embodiments described herein. The Gilbert cell 500 consists of two differential amplifier stages formed by emitter-coupled transistor pairs (Q1/Q4, Q3/Q5) whose outputs are connected (currents summed) with opposite phases at $I_{out1}$ 550 and $I_{out2}$ 552, respectively. The emitter junctions of these amplifier stages are fed by the collectors of a third differential pair (Q2/Q6). The output currents of Q2/Q6 become emitter currents for the differential amplifiers. The output currents $I_{out1}$ 550 and $I_{out2}$ 552 are a 4 quadrant multiplication of the differential base voltages of the $V_1$ 510 and $V_2$ 515 inputs. The capacitive integrator may be periodically sampled to an analog-to-digital (A/D) converter and reset to start a new period.

Figure 6:
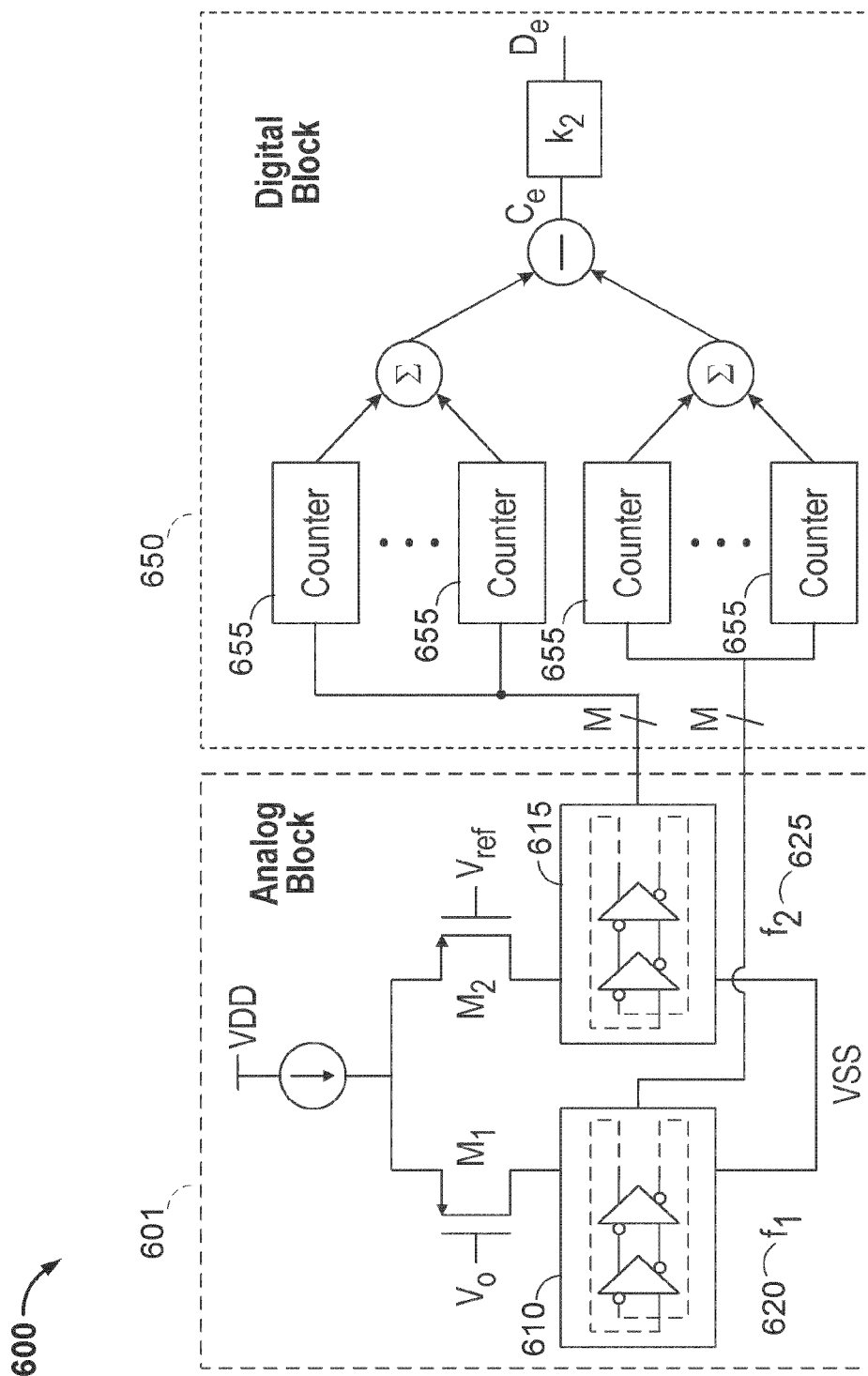
FIG. 6 is a diagram of an exemplary integrator, in accordance with exemplary embodiments described herein.

FIG. 6 is a diagram of an exemplary integrator 600 in accordance with embodiments described herein. The integrator 600 comprises an analog block 601 and a digital block 650. In one implementation, the differential analog signal at the output of the multiplier (e.g., Gilbert multiplier cell 500 of FIG. 5) may be sent to a differential voltage-to-frequency (V/F) converter (e.g. analog block 601). The analog block 601 generates output frequencies $f_1$ 620 and $f_2$ 625 from the voltages $V_O$ and $V_{REF}$ and ring oscillators 610 and 615. The output frequencies $f_1$ 620 and $f_2$ 625 are then sent to the digital block 650. The output frequencies 620 and 625 are then integrated by counters 655; the difference of the integrals is used to generate the measured value of energy $D_e$. A non-limiting benefit of the digital integrator 600 is the ability to calibrate out a possible offset at the analog block 601. By measuring the output frequency with a zero input signal and then subtracting the reading from the previous measurement (or at predetermined times), the integrator 600 may calibrate out a possible offset in the analog measurements of voltages and currents. Misalignment in time between the PTU 404 and PRU 484 measurements occur because there is no real time clock in the wireless power transfer system 100 and therefore it may be difficult to synchronize the measurements at the PTU 404 and PRU 484. This typically adds uncertainty and error in the correlation between the two measurements, thus limiting the reliability of the lost power detection method. An additional benefit of the proposed implementation is that, since the integration time must be long (e.g., >10×) compared to a possible sampling misalignment between the PTU 404 and the PRU 484, the effect of any non-synchronized measurements may be minimized.

In some embodiments, the Gilbert multiplier cell 500 may be connected to the integrator 600 to compute the energy measurement (e.g., integral of the product of current and voltage.) In one aspect, a resistive load on the Gilbert multiplier cell 500 may provide a voltage to be fed to the integrator 600. In another aspect, the Gilbert multiplier cell 500 may be inverted in polarity, so that the current output directly feeds the ring oscillators 610 and 615 of the integrator 600. The combination of a multiplier and an integrator to determine the integral of the product of current and voltage to determine, at least in part, the energy measurement may be included in the PTU 404 and/or the PRU 484.

The PTU 404 may comprise a wireless power transmitter (e.g., the transmitter 104 of FIG. 1) that may transmit power to the PRU 484 within, near, or around an associated charging region. According to one exemplary embodiment, the PTU 404 may be configured to determine whether or not said transmitted energy is unaccounted for (e.g., if the non-compliant object 486 is consuming energy). According to another exemplary embodiment, the PTU 404 may be configured to further determine whether the non-compliant object 486 is consuming energy greater than a specified threshold. The specified threshold may be a fixed value, or it may be dynamically changed based on various specifications of the system components (e.g., a system operating point changing its output energy, a dynamic load demanding a variable amount of energy, etc.), as further described below.

Figure 7:
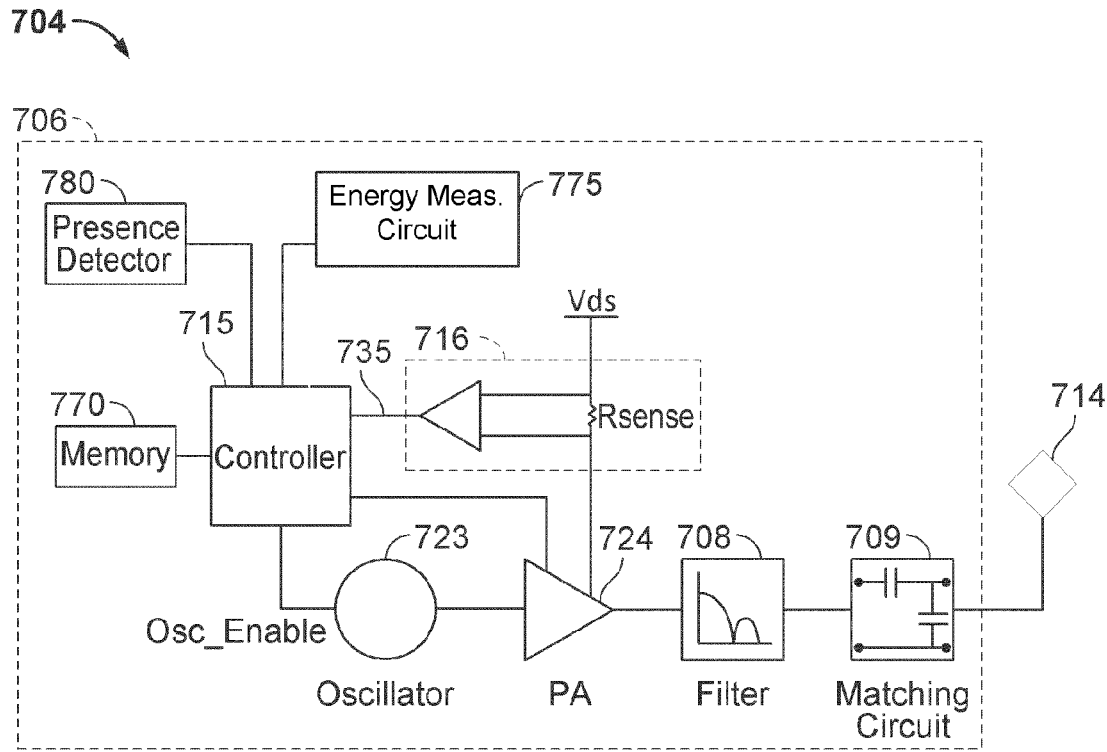
FIG. 7 is a functional block diagram of a transmitter that may be used in the wireless power transfer system of FIG. 1, in accordance with exemplary embodiments of the invention.

FIG. 7 is a functional block diagram of a PTU 704 (such as the PTU 404) that may be used in the wireless power transfer system of FIG. 1, in accordance with exemplary embodiments of the invention. The PTU 704 may receive power through a number of power sources, e.g., an AC-DC converter (not shown) to convert conventional AC power present in a building, a DC-DC converter (not shown) to convert a conventional DC power source to a voltage suitable for the PTU 704, or directly from a conventional DC power source (not shown).

The PTU 704 may include a transmit antenna 714 for generating an electromagnetic or magnetic field, hereinafter referred to as a "charging region." The transmit antenna 714 may be a coil (e.g., an induction coil) and/or an RF antenna, or any other suitable device to wirelessly output power. The transmit antenna 714 may be implemented with a Litz wire or as an antenna strip designed for low resistance. In one implementation, the transmit antenna 714 may be associated with a larger structure, such as a table, mat, lamp, or other stationary configuration. Accordingly, the transmit antenna 714 may not need "turns" to be of a practical dimension. An exemplary implementation of the transmit antenna 714 may be "electrically small" (e.g., a fraction of the wavelength) and tuned to resonate at a usable low frequency by using capacitors (e.g., the capacitors 354 and 356 of FIG. 3) to define the resonant frequency. In an exemplary embodiment, the transmit antenna 714 (or another antenna) may transmit power to a receiver device (e.g., the PRU 484) within, near, or around the charging region. In an exemplary embodiment, the transmit antenna 714 (or another antenna) may receive an acknowledgement from the PRU 484 regarding the amount of power it has received, as described in connection with FIG. 4. The transmit antenna 714 (or another antenna) may also receive information from the PRU 484 about the various specifications of the PRU 484, as described below. The transmit antenna 714 (or another antenna) may also receive confirmation from the PRU 484 that the PRU 484 is fully charged. In one embodiment, the transmit antenna 714 (or another antenna) may communicate with the PRU 484 via a Bluetooth Low Energy (BLE) link.

In one exemplary embodiment, the PTU 704 may not remain on indefinitely. This prevents the PTU 704 from running long after the PRUs 484 in its perimeter are fully charged, which may occur if the transmit antenna 714 fails to receive or receives a faulty confirmation from the PRU 484 when it is fully charged. A user may program the PTU 704 to shut off after a desired amount of time. To prevent the PTU 704 from automatically shutting down if another PRU 484 is placed in its perimeter, the PTU 704 may shut off automatically after a set period of lack of motion detected in its perimeter, as described below. The user may be able to set the inactivity time interval and change it as desired. As a non-limiting example, the time interval may be longer than that needed to fully charge the PRU 484 under the assumption that the PRU 484 is initially fully discharged.

The PTU 704 may further include transmit circuitry 706. The transmit circuitry 706 may include an oscillator 723 for generating oscillating signals (e.g., RF signals). The transmit circuitry 706 may provide RF power to the transmit antenna 714 via the RF signals, resulting in generation of energy (e.g., magnetic flux) about the transmit antenna 714. The PTU 704 may operate at any suitable frequency, e.g., the 6.78 MHz ISM band.

The transmit circuitry 706 may include a fixed impedance matching circuit 709 for matching the impedance of the transmit circuitry 706 (e.g., 50 ohms) to the transmit antenna 714. The transmit circuitry 706 may also include a low pass filter (LPF) 708 configured to reduce harmonic emissions to levels that prevent self-jamming of the PRUs 484. Other exemplary embodiments may include different filter topologies, such as notch filters that attenuate specific frequencies while passing others. The transmit circuitry 706 may further include a driver circuit 724 configured to drive the RF signals. Other exemplary embodiments may include an adaptive impedance match that may be varied based on measurable transmit metrics, such as output power to the transmit antenna 714 or DC current to the driver circuit 724. The transmit circuitry 706 may further comprise discrete devices, discrete circuits, and/or an integrated assembly of components. An exemplary RF power output from the transmit antenna 714 may be from 0.3 watts to 20 watts or may also be a higher or lower value.

The transmit circuitry 706 may further include a controller 715 for, among other functions, selectively enabling the oscillator 723 during transmit phases (or duty cycles) of the PRUs 484. The controller 715 may also adjust the frequency or phase of the oscillator 723. Adjusting the phase of the oscillator 723 and related circuitry in the transmission path may allow for reduction of out-of-band emissions, especially when transitioning from one frequency to another. The controller 715 may also adjust the output power level of the oscillator 723 to implement a communication protocol for interacting with the PRUs 484.

The controller 715 may also perform calculations based on data it sends and receives from other components in the transmit circuitry 706. For use in those calculations, the transmit circuitry 706 may also include a memory 770 for temporarily or permanently storing data. The memory 770 may also store various specifications of the components of the PTU 704 and/or the PRUs 484 for use in calculations as described below.

The controller 715 may gather and track information about the whereabouts and status of the PRUs 484 that may be associated with the PTU 704. Thus, the transmit circuitry 706 may include a presence detector 780 (e.g., a motion detector) to detect the initial presence of the PRU 484 to be charged when the PRU 484 enters the charging region and to turn on the PTU 704 in such an event. The presence detector 780 may detect the PRU 484 via the transmit antenna 714 or another appropriate antenna not shown in FIG. 7. The controller 715 may adjust the amount of power going to or from the driver circuit 724 in response to presence signals from the presence detector 780. The transmit antenna 714 may then transfer RF power to the PRU 484.

The transmit circuitry 706 may further include a load sensing circuit 716 for monitoring the current flowing to the driver circuit 724, which may be affected by the presence or absence of the PRUs 484 or a non-compliant device (e.g., the non-compliant object 486 of FIG. 4) in the vicinity of the charging region as detected by the presence detector 780. The controller 715 may also detect load changes on the driver circuit 724 to determine whether to enable the oscillator 723.

In some embodiments, the transmit circuitry 706 may further include an energy measurement circuit 775. As shown in FIG. 7, the energy measurement circuit 775 is coupled to the controller 715. In other embodiments, the energy measurement circuit 775 may comprise a component of the controller 715. The energy measurement circuit 775 may be used to detect the presence of the non-compliant object 486 affecting the charging region. In some embodiments, the energy measurement circuit 775 may comprise the Gilbert multiplier cell 500 of FIG. 5 and/or the integrator 600 of FIG. 6. The energy measurement circuit 775 may determine whether and to what extent the power or energy transmitted via the transmit antenna 714 is unaccounted for (e.g., determine the amount of lost power or energy). As described above with respect to FIGS. 4A-B, the energy measurement circuit 775 may compare the energy (e.g., the integral of the product of current and voltage) transferred by the PTU 404 or PTU 704 with the energy absorbed by the PRU 484 over the approximately same time period. In some embodiments, the time period may comprise a fraction of a second (e.g., 250-500 ms). In other embodiments, the period of time may be a smaller fraction of time (e.g., 10 ms, 25 ms, 50 ms, 100 ms, etc.) or a greater fraction of time (500 ms, 1 sec, 2 secs, etc.) In some embodiments, the time period may comprise a period of time that is greater than the sampling intervals (e.g., greater than 1×, 2×, 5×, 10×, etc.). The PRU 484 may send the energy absorbed to the PTU 404 and/or PTU 704 via a BLE link or other communication link.

In some embodiments, instead of, or in addition to, sending energy measurement, the PRU 484 may send data relating to the energy absorbed (e.g., current, voltage, etc.) to the PTU 404 and/or PTU 704 for the PTU 404 and/or PTU 704 to determine the amount of energy absorbed at the PRU 484 over the period of time. In some embodiments where multiple PRUs 484 are present, the PTU 704 may receive a message from each PRU 484 indicating the energy absorbed by the corresponding PRU 484. The energy measurement circuit 775 may then compare the sum of the energy absorbed from each PRU 484 with the total energy transferred by the PTU 704. In some embodiments, energy measurement circuit 775 may determine that the difference between the energy transferred and the energy absorbed exceeds a threshold. If so, the energy measurement circuit 775 may then determine that the non-compliant object 486 is present. The energy measurement circuit 775 or controller 715 may then turn off the power to the PTU 704. In another embodiment, rather than simply turning off the PTU 704, the energy measurement circuit 775 or controller 715 may instead or additionally adjust the power level and/or change a state of transmission of power from the PTU 704 to the PRU 484. In some embodiments, the above functions of the energy measurement circuit 775 may be performed by the controller 715. In these embodiments, the energy measurement circuit 775 may be excluded from the transmit circuitry 706.

Figure 8:
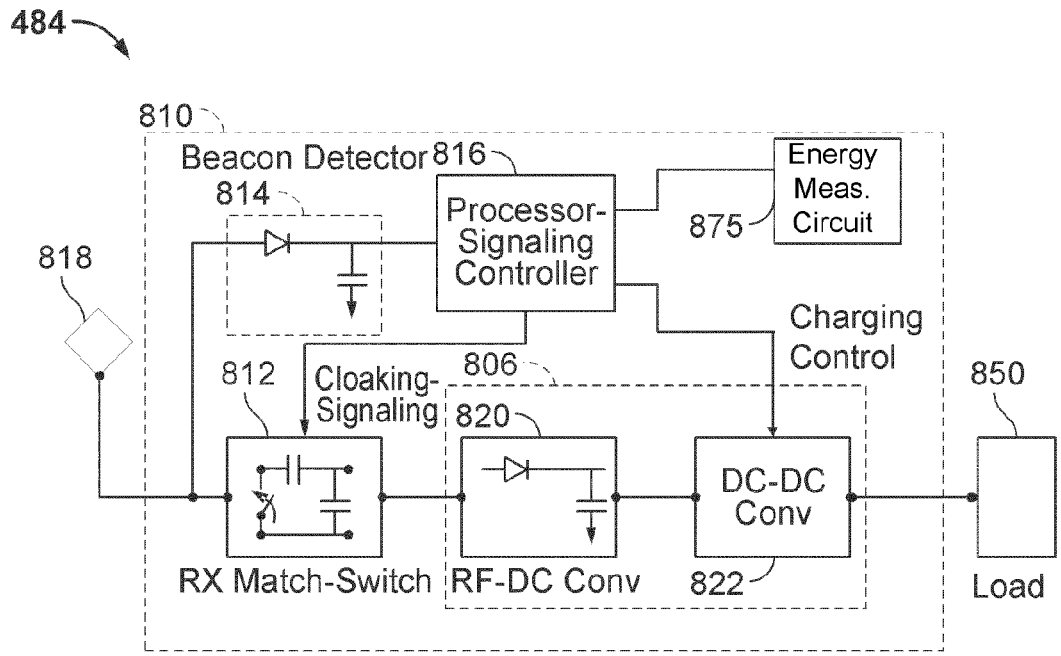
FIG. 8 is a functional block diagram of a receiver that may be used in the wireless power transfer system of FIG. 1, in accordance with exemplary embodiments of the invention.

FIG. 8 is a functional block diagram of the PRU 484 (as in FIG. 4) that may be used in the wireless power transfer system of FIG. 1, in accordance with exemplary embodiments of the invention.

The PRU 484 may include receive circuitry 810 comprising the various components of the PRU 484. The receive circuitry 810 may include a receive antenna 818 for receiving power from a transmit antenna (e.g., the transmit antenna 714 of FIG. 7). The PRU 484 may further couple to a load 850 for providing received power thereto. The load 850 may be external to the PRU 484, or the load 850 may be integrated into the PRU 484 (not shown). The receive circuitry 810 may further include a processor 816 for coordinating the processes of the PRU 484, as described below. The receive circuitry 810 may further include an energy measurement circuit 875. As shown in FIG. 8, the energy measurement circuit 875 is coupled to the processor 816. In other embodiments, the energy measurement circuit 875 may comprise a component of the processor 816.

The receive antenna 818 may be tuned to resonate at a similar frequency, or within a specified range of frequencies, as the transmit antenna 714 (FIG. 7). The receive antenna 818 may be similarly dimensioned with the transmit antenna 714 or it may be differently sized based on the dimensions of the load 850. In one embodiment, the receive antenna 818 may communicate with the transmit antenna 714 via a Bluetooth Low Energy (BLE) link. This communication may allow the PRU 484 to send feedback data to the PTU 704, which may allow the PTU 704 to vary the strength of its magnetic field to adjust the electrical energy being transferred to the PRU 484. If the load 850 comprises a diametric or length dimension smaller than the diameter of length of the transmit antenna 714, then the receive antenna 818 may be implemented as a multi-turn coil to reduce the capacitance value of a tuning capacitor (not shown) and increase the receive coil's impedance. For example, the receive antenna 818 may be placed around the substantial circumference of the load 850 in order to maximize the antenna diameter and reduce the number of loop turns (e.g., windings) of the receive antenna 818 and the inter-winding capacitance.

To transmit power to the load 850, the energy from the transmit antenna 714 may be propagated wirelessly to the receive antenna 818 and then coupled through the rest of the receive circuitry 810 to the load 850. In some embodiments, the energy measurement circuit 875 may comprise the Gilbert multiplier cell 500 of FIG. 5 and/or the integrator 600 of FIG. 6. The energy measurement circuit 875 may determine the power or energy received from the transmit antenna 714 via the receive antenna 818. As described above with respect to FIGS. 4A-B, the energy measurement circuit 875 may determine the energy (e.g., the integral of the product of current and voltage) absorbed by the PRU 484 over the approximately same time period as the energy measurement circuit 775 of the PTU 404 and/or PTU 704 of FIG. 7 determines the amount of energy transmitted. The PRU 484 may send the determined energy absorbed via the receive antenna 818 to the PTU 404 and/or PTU 704 via a BLE link or other communication link. In some embodiments, the PRU 484 may send energy data (e.g., voltage, current, etc.) to the PTU 404 and/or PTU 704 for the PTU 404 and/or PTU 704 to determine the energy absorbed at the PRU 484. In some embodiments where multiple PRUs 484 are present, each PRU 484 may transmit to the PTU 404 and/or PTU 704 the energy absorbed by the corresponding PRU 484. As described above with respect to FIG. 7, the controller 715 and/or the energy measurement circuit 875 of the PTU 404 and/or PTU 704 may then detect the presence of the non-compliant object 486 based at least in part on the energy measurements from the one or more PRUs 484.

For more efficient power transfer, the receive circuitry 810 may provide an impedance match to the receive antenna 818. To help accomplish this, the receive circuitry 810 may include power conversion circuitry 806 for converting a received RF energy source into charging power for use by the load 850.

The power conversion circuitry 806 may include an RF-to-DC converter 820 to rectify the RF energy signal received at the receive antenna 818 into a non-alternating power with an output voltage. The RF-to-DC converter 820 may be a partial or full rectifier, a regulator, a bridge, a doubler, a linear or switching converter, etc.

The power conversion circuitry 806 may also include a DC-to-DC converter 822 (or other power regulator) to convert the rectified RF energy signal into an energy potential (e.g., voltage) that is compatible with the load 850.

The receive circuitry 810 may further include switching circuitry 812 for connecting or disconnecting the receive antenna 818 to or from the power conversion circuitry 806. Disconnecting the receive antenna 818 from the power conversion circuitry 806 may suspend charging of the load 850 and/or change the "load" 850 as "seen" by the PTU 704.

In some embodiments, the PTU 704 may require the PRU 484 to conduct a "calibration" procedure as follows. A "step" in the PRU 484 power absorption can be generated, which is added to the existing load. This step can be implemented, for example, by switching a resistive load either at the output of the DC-DC converter 822 or at the rectified output. Correspondingly, a new measurement is conducted by both the PRU 484 and the PTU 704. Assuming that no other change occurs in the overall power delivery system, the PTU 704 and the PRU 484 may record a "delta" or change in power relative to prior measurements. Independently of the actual value of the additional power, as long as the change in power can be measured with sufficient resolution, this will provide an efficiency coefficient, which can be utilized to better assess the total power delivered by the PTU 704 and associated with the PRU 484. Multiple steps can be sequentially completed in order to better avoid errors due to other changes occurring in the system.

This calibration method, however, may not account for an additional component of loss: the induced heat in the PRU 484 metal components and other losses generated by the mere presence of the PRU 484 on the PTU 704. Such losses may be assessed by another procedure: when the PRU 484 is placed on the PTU 704, and prior to the PRU 484 absorbing power, the PTU 704 may record the change in overall power absorption and associated with the PRU 484 as a fixed (not measured by the PRU 484) loss. If multiple PRU's 484 are placed on the PTU 704 at the same time, or other power absorbing objects are placed at the same time the change in overall power absorption measurement may not be account for PRU's 484. One possible way of managing such inaccuracies may be implemented by the PRU 484 providing an "estimate" of such losses during a "login" process. This method may require that the manufacturer of the PRU 484 store in a register the typical power loss associated with placing the PRU 484 on a master PTU 704. The PTU 704 manufacturer may then optionally adjust this information based on his knowledge of how its PTUs 704 compare to the master PTU 704. This approach may improve the error associated with a lost power algorithm.

When multiple PRUs 484 are present in the PTU 704 charging field, the processor 816 may be configured to time-multiplex (e.g., switch) the loading and unloading of one or more PRUs 484 to enable other PRUs 484 to more efficiently couple to the PTU 704. Unloading of the PRU 484 (hereinafter referred to as "cloaking" or "cloaked") may eliminate coupling to other nearby PRUs 484 or reduce loading on nearby PTUs 704. Cloaking may also occur upon the occurrence of other events, e.g., detection of an external wired charging source (e.g., wall/USB power) providing charging power to the load 850. The switching between unloading and loading may be detected by the PTU 704. Therefore, the switching between unloading and loading may be performed at a particular speed to function as a protocol that enables the sending of a message from the PRU 484 to the PTU 704. By way of example, the switching speed may be on the order of 100 μsec. Using this switching technique, the PRU 484 may be configured to send various specifications about the PRU 484 to the PTU 704, e.g., specifications for the PTU 704 to calculate the difference in energy between the PTU 704 and the PRU 484.

In an exemplary embodiment, communication between the PTU 704 and the PRU 484 refers to a device sensing and charging control mechanism, rather than conventional two-way communication (e.g., in band signaling using the coupling field). In other words, the PTU 704 may use on/off keying of the transmitted signal to adjust whether energy is available in the near-field. The PRU 484 may interpret these changes in energy as a message from the PTU 704. From the receiver side, the PRU 484 may use tuning and de-tuning of the receive antenna 818 to adjust how much power is being accepted from the field. In some cases, the tuning and de-tuning may be accomplished via the switching circuitry 812. The PTU 704 may detect this difference in power used from the field and interpret these changes as a message from the PRU 484. Other forms of modulation of the transmit power and the load 850 behavior may be utilized.

The receive circuitry 810 may further include signaling and beacon detector circuitry 814 to identify received energy fluctuations that may be informational signaling from the PTU 704 to the PRU 484. The processor 816 may monitor the signaling and beacon detector circuitry to determine a beacon state and extract messages sent from the PTU 704. Furthermore, the signaling and beacon detector circuitry 814 may be used to detect the transmission of a reduced RF signal energy (e.g., a beacon signal). The signaling and beacon detector circuitry 814 may further rectify the reduced RF signal energy into a nominal power for awakening either un-powered or power-depleted circuits within receive circuitry 810 in order to configure receive circuitry 810 for wireless charging.

Figure 9:
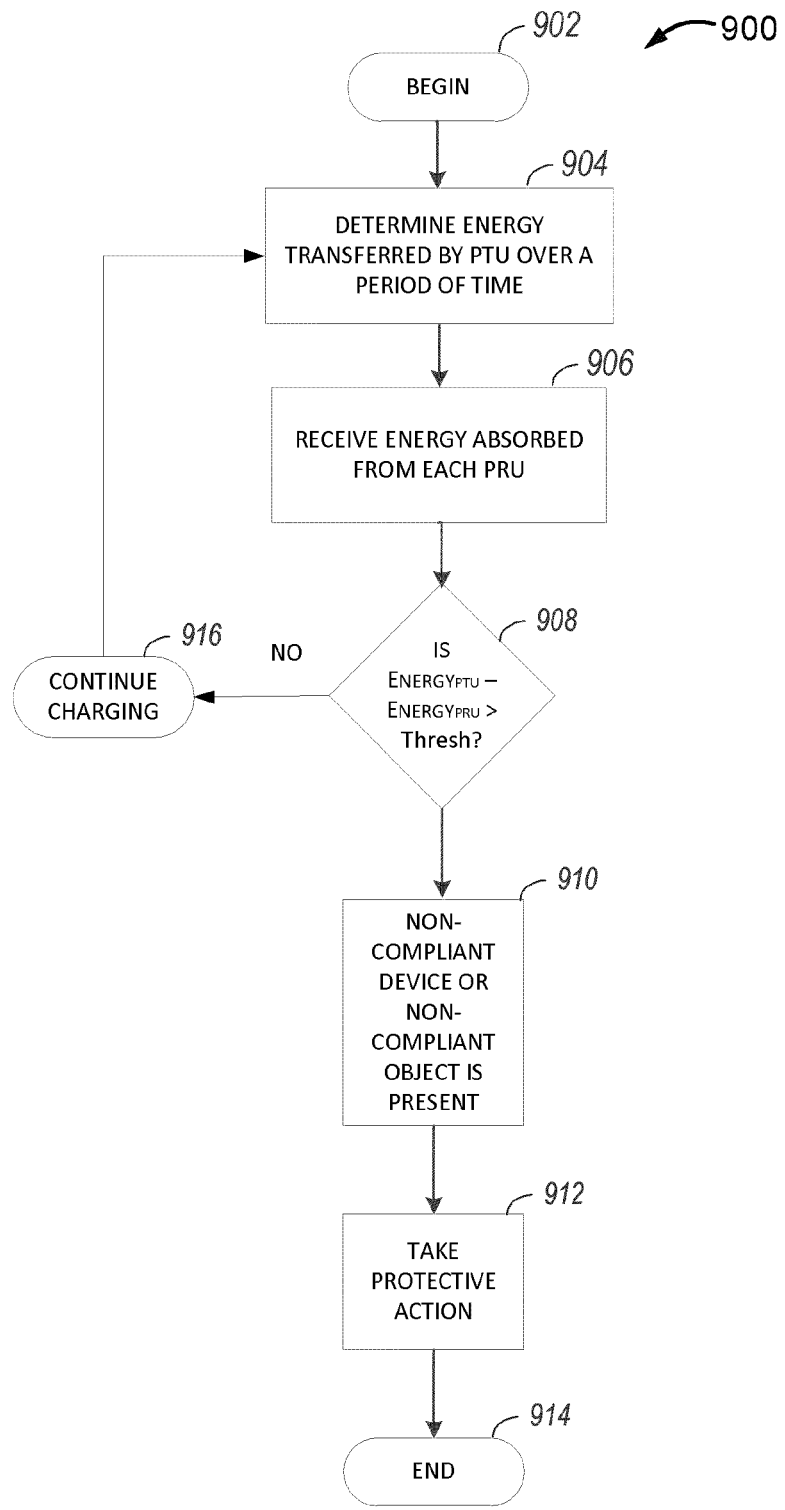
FIG. 9 is a flowchart of an exemplary method for determining whether a non-compliant object is present within, near, or around a charging region.

FIG. 9 illustrates a flowchart 900 of an exemplary method for the controller 715 (of FIG. 7) to determine whether a non-compliant object (e.g., the non-compliant object or the non-compliant device 486) is affecting the charging region (as described above in regards to FIG. 7). At block 902, the controller 715 begins the method when the PTU 704 is charging one or more PRUs (e.g., the PRUs 484). At block 904, the controller 715 determines the energy transferred by the PTU 704 over a period of time. At block 906, the controller receives from the PRUs 484 the energy absorbed by each PRU 484 over approximately the same period of time. The controller 715 can determine the energy transferred, and the PRU 484 can determine the energy absorbed, at least in part, by computing the integral of the current and power of the PTU 704 or PRU 484, respectively, as described above with respect to FIGS. 5 and 6. At block 908, the controller 715 compares the total energy transferred by the PTU 704 with the sum of the energy absorbed from each PRU 484 and determines whether the difference satisfies a threshold for acceptable energy loss. If not, then the controller 715 continues charging the PRUs 484 in block 916 and then returns to block 904. If the difference does exceed the threshold, then at block 910, the controller 715 determines that the non-compliant object 486 is present. Then at block 912, the controller 715 takes a protective action. In some embodiments, a protective action may comprise the controller 715 turning off the power to the PTU 704. In another embodiment, rather than simply turning off the power, the PTU 704 may instead or additionally adjust the power level and/or change a state of transmission of power from the PTU 704 to the PRU 484. The method ends at block 914.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for transmitting power may comprise the transmit antenna 114, 214, 714 or the transmit or receive antenna 352 of FIGS. 1, 2, 7, and 3 above, respectively. In addition, means for receiving from the one or more chargeable devices a measurement of a first amount of energy received by the one or more chargeable devices over a first period of time may comprise the receive antenna 118, 218, 818 or the transmit or receive antenna 352 of FIGS. 1, 2, 8, and 3 above, respectively. Further, means for measuring a second amount of energy provided by the transmitting means over a second period of time may comprise the controller 715 or energy measurement circuit 775 of FIG. 7. Also, means for determining whether an object other than the one or more chargeable devices is absorbing power may comprise the controller 715 or energy measurement circuit 775 of FIG. 7.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly transferring power, the apparatus comprising:
    an antenna configured to provide wireless power to a chargeable device sufficient to charge or power the chargeable device positioned within a charging region of the antenna;
    a receiver configured to receive from the chargeable device a measurement of a first amount of energy received by the chargeable device over a first period of time, wherein the first amount of energy is determined based upon an integral of an amount of power received by the chargeable device over the first period of time; and
    a processor configured to:
        determine a second amount of energy provided by the antenna over a second period of time, based upon an integral of an amount of power provided by the antenna over a second period of time;
        compare the first amount of energy received from the chargeable device to the second amount of energy provided by the antenna over the second period; and
        determine whether an object other than the chargeable device is absorbing power provided via the antenna based at least in part on comparing the first amount and the second amount of energy.

2. The apparatus of claim 1, wherein the first period of time is substantially the same as the second period of time.

3. The apparatus of claim 1, wherein the first period of time comprises a time period greater than 250 milliseconds.

4. The apparatus of claim 1, wherein the processor is further configured to sample the power provided by the antenna at a certain time interval.

5. The apparatus of claim 4, wherein the first period of time comprises a time period greater than the time interval for sampling the power provided by the antenna.

6. The apparatus of claim 1, wherein the processor is further configured to determine the integral of the amount of power provided by the antenna over the second period of time, at least in part, by determining a sum of a product of a first current value and a first voltage value at a first time and a product of a second current value and a second voltage value at a second time.

7. The apparatus of claim 1, wherein the processor comprises a multiplier cell and an integrator circuit.

8. The apparatus of claim 7, wherein the multiplier cell comprises a Gilbert multiplier cell.

9. The apparatus of claim 1, wherein the processor is further configured to determine an object other than the chargeable device is absorbing power provided via the antenna when a difference between the first amount received from the chargeable device and the second amount of energy provided by the antenna satisfies a threshold.

10. The apparatus of claim 9, wherein the antenna is further configured to reduce or discontinue providing power to the chargeable device upon the processor determining the object other than the chargeable device is absorbing power provided via the antenna.

11. A method for wirelessly transferring power, the method comprising:
    transmitting power from a transmitter at a power level sufficient to power or charge a chargeable device positioned within a charging region;
    receiving from the chargeable device a measurement of a first amount of energy received by the chargeable device over a first period of time, wherein the first amount of energy is determined based upon an integral of an amount of power received by the chargeable device over the first period of time;
    determining a second amount of energy provided by the transmitter over a second period of time, based upon an integral of an amount of power provided by the antenna over a second period of time;
    comparing the first amount of energy received from the chargeable device over the first period to the second amount of energy provided by the transmitter over the second period; and
    determining whether an object other than the chargeable device is absorbing power provided via the transmitter based at least in part on comparing the first amount and the second amount of energy.

12. The method of claim 11, wherein the first period of time is substantially the same as the second period of time.

13. The method of claim 11, further comprising sampling the power provided by the transmitter at a certain time interval.

14. The method of claim 11, wherein determining the integral of the amount of power provided comprises determining a sum of a product of a first current value and a first voltage value at a first time and a product of a second current value and a second voltage value at a second time.

15. The method of claim 11, wherein determining whether an object other than the chargeable device is absorbing power comprises determining whether a difference between the first amount of energy received from the chargeable device and the second amount of energy provided by the transmitter satisfies a threshold.

16. The method of claim 15, further comprising reducing or discontinuing transmitting power to the chargeable device upon the processor determining the object other than the chargeable device is absorbing power provided via the transmitter.

17. An apparatus for wirelessly transferring power, the apparatus comprising:
    means for transmitting power at a power level sufficient to power or charge a chargeable device positioned within a charging region;
    means for receiving from the chargeable device a measurement of a first amount of energy received by the chargeable device over a first period of time, wherein the first amount of energy is determined based upon an integral of an amount of power received by the chargeable device over the first period of time;
    means for determining a second amount of energy provided by the transmitting means over a second period of time, based upon an integral of an amount of power provided by the antenna over a second period of time;
    means for comparing the first amount of energy received from the chargeable device over the first period to the second amount of energy provided by the transmitting means over the second period; and means for determining whether an object other than the chargeable device is absorbing power provided via the transmitting means based at least in part on comparing the first amount and the second amount of energy.

18. The apparatus of claim 17, wherein the first period of time is substantially the same as the second period of time.

19. The apparatus of claim 17, further comprising means for sampling the power provided by the transmitting means at a certain interval.

20. The apparatus of claim 17, wherein the means for determining the integral of the amount of power provided comprises means for determining a sum of a product of a first current value and a first voltage value at a first time and a product of a second current value and a second voltage value at a second time.

21. The apparatus of claim 17, wherein the means for determining an object other than the chargeable device is absorbing power provided via the transmitting means comprises means for determining when a difference between the first amount of energy received from the chargeable device and the second amount of energy provided by the transmitting means satisfies a threshold.

22. The apparatus of claim 21, further comprising means for reducing or discontinuing transmitting power to the chargeable device upon the determining means determining the object other than the chargeable device is absorbing power provided via transmitting means.

23. A non-transitory computer readable medium comprising instructions stored thereon, which when executed by a processor cause the processor to perform a method of:
transmitting power from a transmitter at a power level sufficient to power or charge a chargeable device positioned within a charging region;
receiving from the chargeable device a measurement of a first amount of energy received by the chargeable device over a first period of time, wherein the first amount of energy is determined based upon an integral of an amount of power received by the chargeable device over the first period of time;
determining a second amount of energy provided by the transmitter over a second period of time, based upon an integral of an amount of power provided by the antenna over a second period of time;
comparing the first amount of energy received from the chargeable device over the first period to the second amount of energy provided by the transmitter over the second period; and
determining whether an object other than the chargeable device is absorbing power provided via the transmitter based at least in part on comparing the first amount and the second amount of energy.

24. The medium of claim 23, further comprising instructions that would cause a processor to perform a method of sampling the power provided by the transmitter at a certain interval.

25. The medium of claim 23, wherein determining whether an object other than the chargeable device is absorbing power comprises determining whether a difference between the first amount of energy received from the chargeable device and the second amount of energy provided by the transmitter satisfies a threshold.

26. The medium of claim 25, further comprising instructions that would cause a processor to perform a method of reducing or discontinuing transmitting power to the chargeable device upon the processor determining the object other than the chargeable device is absorbing power provided via the transmitter.

* * * * *